US012581239B2

(12) United States Patent
Prabha et al.

(10) Patent No.: US 12,581,239 B2
(45) Date of Patent: Mar. 17, 2026

(54) TECHNOLOGIES FOR WIRELESS AUDIO DEVICE SELECTION

(71) Applicant: Intel Corporation, Santa Clara, CA (US)

(72) Inventors: Abhijith Prabha, Ernakulam (IN); Vamshi Krishna Aagiru, Bangalore (IN); Shailendra Singh Chauhan, Bangaluru (IN)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 17/856,277

(22) Filed: Jul. 1, 2022

(65) Prior Publication Data

US 2022/0337953 A1     Oct. 20, 2022

(51) Int. Cl.
| | |
|---|---|
| *H04R 5/04* | (2006.01) |
| *G06T 7/70* | (2017.01) |
| *H04R 5/033* | (2006.01) |
| *H04W 76/40* | (2018.01) |

(52) U.S. Cl.
CPC ................. *H04R 5/04* (2013.01); *G06T 7/70* (2017.01); *H04R 5/033* (2013.01); *H04W 76/40* (2018.02); *H04R 2420/01* (2013.01); *H04R 2420/07* (2013.01)

(58) Field of Classification Search
CPC ........ H04R 5/04; H04R 1/1008; H04R 5/033; H04R 2420/01; H04R 2420/03; H04R 2420/07; G06T 7/70; H04W 76/40

USPC ........................................................ 381/300
See application file for complete search history.

(56) References Cited

U.S. PATENT DOCUMENTS

| | | | |
|---|---|---|---|
| 2006/0229014 A1 | 10/2006 | Harada et al. | |
| 2015/0078573 A1* | 3/2015 | Nicholson | H04R 1/10 381/74 |
| 2019/0121613 A1* | 4/2019 | Chang | G06Q 20/3224 |

OTHER PUBLICATIONS

Lee , Ealwan. "High Accuracy Distance Measurement for Bluetooth Based on Phase Ranging." TTA—Workshop 2019, vol. GCT Semiconductor, Inc: De-facto Standard Development Organization #3, May 2019, pp. 23.

* cited by examiner

*Primary Examiner* — Paul Kim
(74) *Attorney, Agent, or Firm* — Alliance IP, LLC

(57) ABSTRACT

Techniques for wireless audio device selection are disclosed. In the illustrative embodiment, a compute device uses visual training to recognize headphones worn by a user. When the user puts on the headphones, the compute device may recognize the headphones and automatically route audio output to the headphones. In some embodiments, when selecting from several possible wireless audio output devices, the compute device may determine a distance to each of the wireless audio output devices and select one of the wireless audio output devices based on the distance to the wireless audio output device.

23 Claims, 6 Drawing Sheets

300

302 — DETERMINE WHETHER NEW HEADPHONES DETECTED

304

FROM
FIG. 4    [C]

NEW HEADPHONES DETECTED?    NO

[A]    TO
FIG. 4

YES

306 — PAIR NEW HEADPHONES

308 — REQUEST VISUAL TRAINING OF NEW HEADPHONES

310

VISUAL TRAINING ACCEPTED?    NO

YES

312 — PERFORM VISUAL TRAINING

314 — ACCESS HEADPHONE IMAGE DATABASE

TECHNOLOGIES FOR WIRELESS AUDIO DEVICE SELECTION

BACKGROUND

A compute device is often paired with several wireless audio devices, such as headphones or speakers. When several paired wireless audio devices are active at the same time, the compute device needs to determine which device to output audio to. Common approaches include providing audio to the most recently used device or providing audio to the device at the top of a priority list. However, such approaches may result in a device other than the one the user wants to use being selected.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 3-6 are a simplified flow diagram of at least one embodiment of a method for wireless audio device selection that may be executed by the compute device of FIG. 1.

DETAILED DESCRIPTION OF THE DRAWINGS

Figure 1:
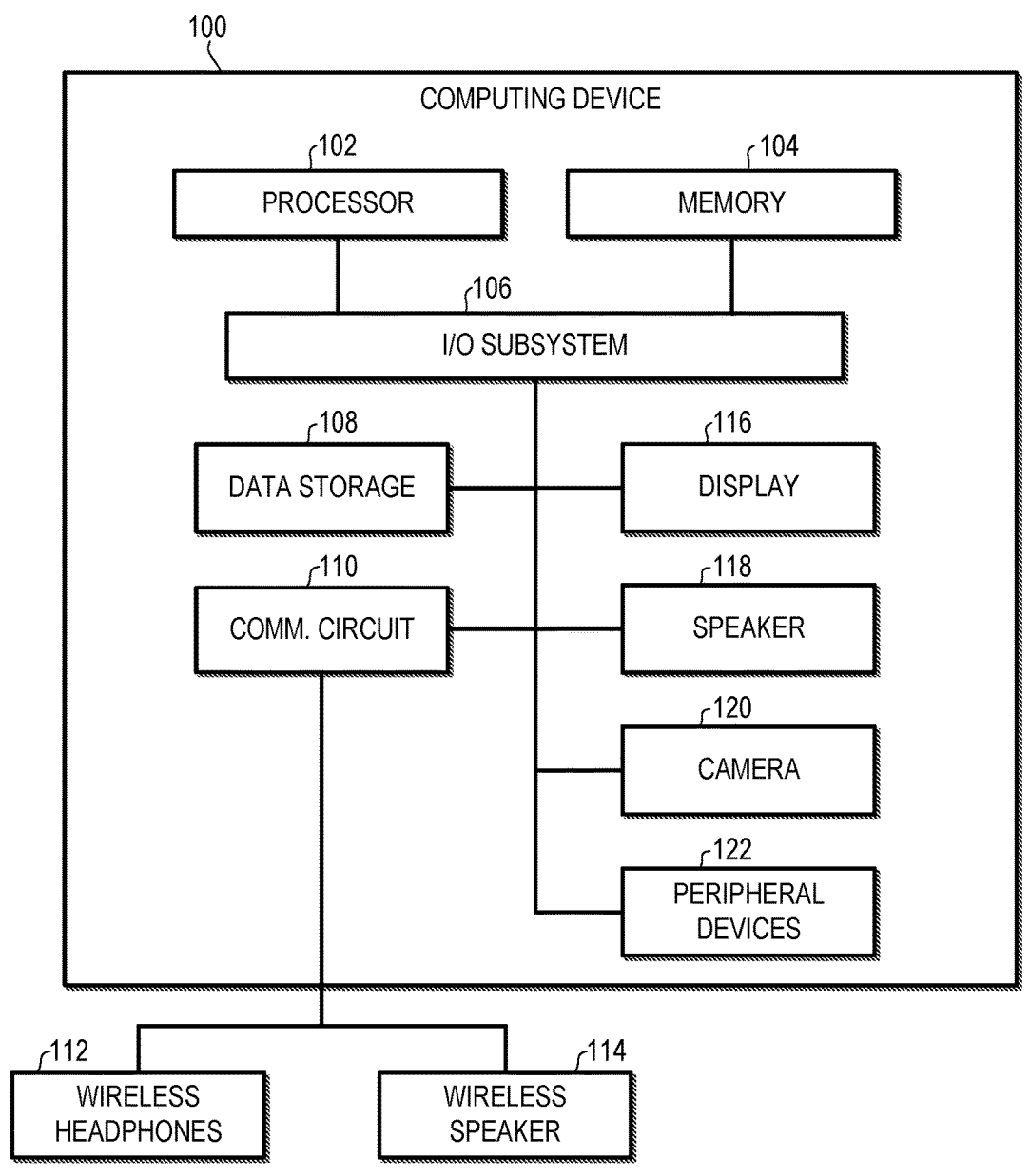
FIG. 1 is a simplified block diagram of at least one embodiment of a compute device for wireless audio device selection.

Referring to FIG. 1, in an illustrative embodiment, a compute device 100 may be connected to several wireless audio devices, such as wireless headphones 112 and wireless speakers 114. In the illustrative embodiment and as discussed below in more detail, the compute device 100 may use factors such as images of the user wearing the wireless headphones 112 or distance of the wireless devices 112, 114 to select a device for audio output.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B);

(C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. Terms modified by the word "substantially" include arrangements, orientations, spacings, or positions that vary slightly from the meaning of the unmodified term. For example, a stereoscopic camera with a field of view of substantially 180 degrees includes cameras that have a field of view within a few degrees of 180 degrees.

The illustrative compute device 100 includes one or more processors 102, a memory 104, an input/output (I/O) subsystem 106, data storage 108, a communication circuit 110, a display 116, one or more speakers 118, a camera 120, and one or more peripheral devices 122. In some embodiments, one or more of the illustrative components of the compute device 100 may be incorporated in, or otherwise form a portion of, another component. For example, the memory 104, or portions thereof, may be incorporated in the processor 102 in some embodiments. In some embodiments, one or more of the illustrative components may be physically separated from another component.

The processor 102 may be embodied as any type of processor capable of performing the functions described herein. For example, the processor 102 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 106 may connect various internal and external components of the compute device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The communication circuit 110 may be embodied as any type of interface capable of interfacing the compute device 100 with other compute devices, such as over one or more wired or wireless connections. In some embodiments, the communication circuit 110 may be capable of interfacing with any appropriate cable type, such as an electrical cable or an optical cable. The communication circuit 110 may be configured to use any one or more communication technology and associated protocols (e.g., Ethernet, Bluetooth®, Wi-Fi®, WiMAX, near field communication (NFC), 4G, 5G, etc.). The communication circuit 110 may be located on silicon separate from the processor 102, or the communication circuit 110 may be included in a multi-chip package with the processor 102, or even on the same die as the processor 102. The communication circuit 110 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 100 to connect with another compute device. In some embodiments, communication circuit 110 may be embodied as part of a system-on-a-chip (SoC) that includes one or more processors or may be included on a multichip package that also contains one or more processors. In some embodiments, the communication circuit 110 may include a local processor (not shown) and/or a local memory (not shown) that are both local to the communication circuit 110. In such embodiments, the local processor of the communication circuit 110 may be capable of performing one or more of the functions of the processor 102 described herein. Additionally or alternatively, in such embodiments, the local memory of the communication circuit 110 may be integrated into one or more components of the compute device 100 at the board level, socket level, chip level, and/or other levels.

The communication circuitry 110 may be connected or one or more wireless audio devices, such as one or more wireless headphones 112 and/or one or more wireless speakers 114. In the illustrative embodiment, the wireless headphones 112 and the wireless speakers 114 are connected by Bluetooth® connections. As used herein, headphones refers to any audio device worn near the ears of a user. Headphones 112 may be embodied as, e.g., a headset, earphones, earbuds, bone conduction headphones, headphones with band connecting two earbuds, headphones without a band connecting two earbuds, etc. In some embodiments, headphones 112 may refer to a single audio emitter, such as a single earbud or single earphone.

The display 116 may be embodied as any type of display on which information may be displayed to a user of the compute device 100, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology.

The one or more speakers 118 may be embodied as any type of speaker, such as a speaker integrated into a housing of a laptop or cell phone. In some embodiments, the speaker 118 may be an external speaker 118 connected to a housing of the compute device 100 through a cable.

The camera 120 may include one or more fixed or adjustable lenses and one or more image sensors. The image sensors may be any suitable type of image sensors, such as a CMOS or CCD image sensor. The camera 120 may have any suitable aperture, focal length, field of view, etc. For example, the camera 120 may have a field of view of 30-110° in the azimuthal and/or elevation directions.

In some embodiments, the compute device 100 may include other or additional components, such as those commonly found in a compute device. For example, the compute device 100 may also have peripheral devices 122, such as a keyboard, a mouse, an external storage device, etc. In some embodiments, the compute device 100 may be connected to a dock that can interface with various devices, including peripheral devices 122.

Figure 2:
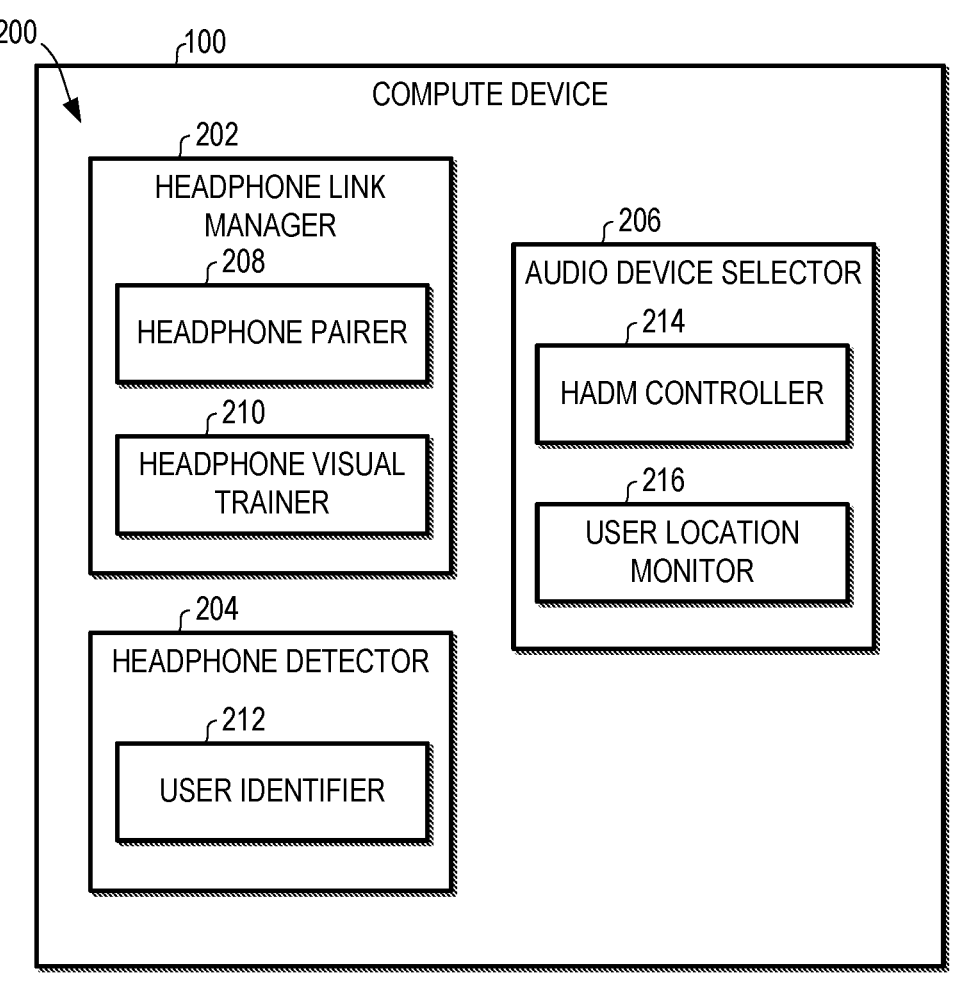
FIG. 2 is a simplified block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a headphones link manager 202, a headphone detector 204, and an audio device selector 206. The various modules of the environment 200 may be embodied as hardware, software, firmware, or a combination thereof. For example, the various modules, logic, and other components of the environment 200 may form a portion of, or otherwise be established by, the processor 102, the memory 104, the data storage 108, or other hardware components of the compute device 100. As such, in some embodiments, one or more of the modules of the environment 200 may be embodied as circuitry or collection of electrical devices (e.g., headphones link manager circuitry 202, headphone detector circuitry 204, audio device selector circuitry 206, etc.). It should be appreciated that, in such embodiments, one or more of the circuits (e.g., the headphones link manager circuitry 202, the headphone detector circuitry 204, the audio device selector circuitry 206, etc.) may form a portion of one or more of the processor 102, the memory 104, the I/O subsystem 106, the data storage 108, and/or other components of the compute device 100. For example, in some embodiments, some or all of the modules may be embodied as the processor 102 as the memory 104 and/or data storage 108 storing instructions to be executed by the processor 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules that implement such functionality will be embodied at least partially as hardware.

The headphone link manager 202, which may be embodied as hardware, firmware, software, virtualized hardware, emulated architecture, and/or a combination thereof as discussed above, is configured to manage links and other device information with wireless audio devices, such as wireless headphones 112 and wireless speakers 114. The headphone link manager 202 may detect when new headphones 112 as an available wireless device, such as an available Bluetooth® device. The headphone link manager 202 includes a headphone pairer 208 that pairs new headphones 112. The headphone pairer 208 may prompt the user for input as part of the pairing process, such as a code associated with the new headphones 112.

After pairing new headphones 112, the headphone link manager 202 uses a headphone visual trainer 210 to request visual training of the new headphones 112. The headphone visual trainer 210 may, e.g., prompt the user of the compute device 100 to begin a training process. The headphone visual trainer 210 uses the camera 120 to capture images of the user wearing the headphones 112. The headphone visual trainer 210 may, e.g., prompt the user to turn his or her head at different angles. The headphone visual trainer 210 may use machine-learning-based algorithms to recognize the headphones 112 worn by the user. In some embodiments, headphone visual trainer 210 may automatically perform visual training without an explicit request or instructions from the user.

If the user does not perform visual training, the headphone link manager 202 may access images of the headphones 112 from a database. The headphone link manager 202 may, e.g., access images corresponding to the model of the headphones 112. The accessed images may be used by the headphone link manager 202 to identify the headphones 112. The headphone link manager 202 may save the images or may save parameters of a machine-learning-based algorithm that can recognize the headphones 112 in the images. The parameters may include, e.g., color, type, dimension, etc.

The headphone detector 204, which may be embodied as hardware, firmware, software, virtualized hardware, emulated architecture, and/or a combination thereof as discussed above, is configured to detect headphones 112 worn by the user of the compute device 100 in one or more images captured by the camera 120. To do so, the headphone detector 204 may use images or parameters stored during a visual training performed by the headphone link manager 202. In some embodiments, the headphone detector 204 may recognize headphones 112 for which the compute device 100 has not been visually trained.

If headphones 112 are detected, the headphone detector 204 identifies the headphones 112 that the user is wearing. The headphone detector 204 may identify the headphones 112 based on the visual training performed on the headphones 112, may identify the headphones 112 based on images or other information in a database, or may identify the headphones 112 based on a connection to the headphones 112. For example, if only one set of headphones 112 is connected to the compute device 100, the headphone detector 204 may infer that the headphones 112 the user is wearing are the same headphones 112 connected to the compute device 100. In another example, the headphone detector 204 may observe that headphones 112 were connected about the same time the user put on the headphones 112 and infer that the headphones 112 that were just connected are the same headphones 112 the user put on. In some embodiments, the headphone detector 204 identifies headphones 112 based on a distance to the headphones 112 from the compute device 100. The headphone detector 204 may use, e.g., high accuracy distance measurement (HADM) using wireless signals to determine a distance of the headphones 112.

In the illustrative embodiment, the headphone detector 204 includes a user identifier 212 that can identify the user wearing the headphones 112. The headphone detector 204 may temporarily register a face of the user wearing the headphones 112. As the headphone detector 204 has identified the user wearing the headphones 112, the headphone detector 204 can maintain audio routing to the headphones 112, even if the registered user leaves the view of the camera 120. Additionally, if another person comes into the field of view, the headphone detector 204 can maintain the audio routed to the headphones 112, even if, e.g., the other person is wearing, puts in, or removes a different set of headphones 112, ensuring privacy for the registered user.

In the illustrative embodiment, the headphone detector 204 may also check whether the headphones 112 have been removed, such as by analyzing images of the user taken by the camera 120. If the headphones 112 have been removed, the headphone detector 204 may determine whether the user has put on a new set of headphones 112, which the headphone detector 204 may identify, as described above. If the user has not put on a new set of headphones, the headphone detector 204 may notify the audio device selector 206 to select an audio device for audio output.

In some embodiments, the headphone detector 204 may also monitor images of the user as wireless headphones 112 and/or wireless speakers 114 are powered on. If, e.g., someone besides the user has turned on wireless headphones 112 and/or wireless speakers 114 paired with the compute device 100, the headphone detector 204 may determine that the user did not interact with the newly-powered on wireless headphones 112 and/or wireless speakers 114. As such, the headphone detector 204 may avoid routing audio output to the newly-powered on wireless headphones 112 and/or wireless speakers 114 in order to avoid audio disruptions for the user of the compute device 100.

The audio device selector 206, which may be embodied as hardware, firmware, software, virtualized hardware, emulated architecture, and/or a combination thereof as discussed above, is configured to select an audio device to output audio to, particularly when the user is not wearing headphones 112 that are powered on and paired with the compute device 100. The audio device selector 206 may identify active wireless audio devices, such as wireless headphones 112 and wireless speakers 114. The audio device selector 206 may identify, e.g., wireless audio devices 112, 114 that are powered on and paired to the compute device 100. The audio device selector 206 may use a high accuracy distance measurement (HADM) controller 214 to determine a distance to each of the active wireless audio devices 112, 114. The HADM controller 214 may use, e.g., high accuracy distance measurement (HADM) using wireless signals to determine a distance of the active wireless audio devices 112, 114.

The audio device selector 206 presents a list of nearby active wireless audio devices 112, 114 to the user. A device 112, 114 may be considered nearby if it is within a threshold distance of the compute device 100, such as 1-5 meters. The audio device selector 206 may receive a selection of a wireless audio device 112, 114 from a user. The audio device selector 206 may then route audio output to the selected device 112, 114.

The audio device selector 206 includes a user location monitor 216. The user location monitor 216 monitors the location of the user to determine whether the user is moving away from the compute device 100, such as by checking whether the user is within a frame of images captured by the camera 120. If the user is moving away, the user location monitor 216 may route audio output to headphones 112 of the user, allowing the user to continue hearing the audio as the user walks away from the compute device 100.

If the audio device selector 206 does not identify any wireless audio devices 112, 114 nearby, the audio device selector 206 routes audio output to the system speakers 118.

Referring now to FIG. 3, in use, the compute device 100 may execute a method 300 for wireless audio device selection. The method 300 begins in block 302, in which the compute device 100 determines whether new headphones 112 are detected. The compute device 100 may detect new headphones 112 as an available wireless device, such as an available Bluetooth® device. In some embodiments, the compute device 100 may detect new headphones 112 by identifying them in images from the camera 120, such as when the user puts on new headphones 112.

Figure 4:
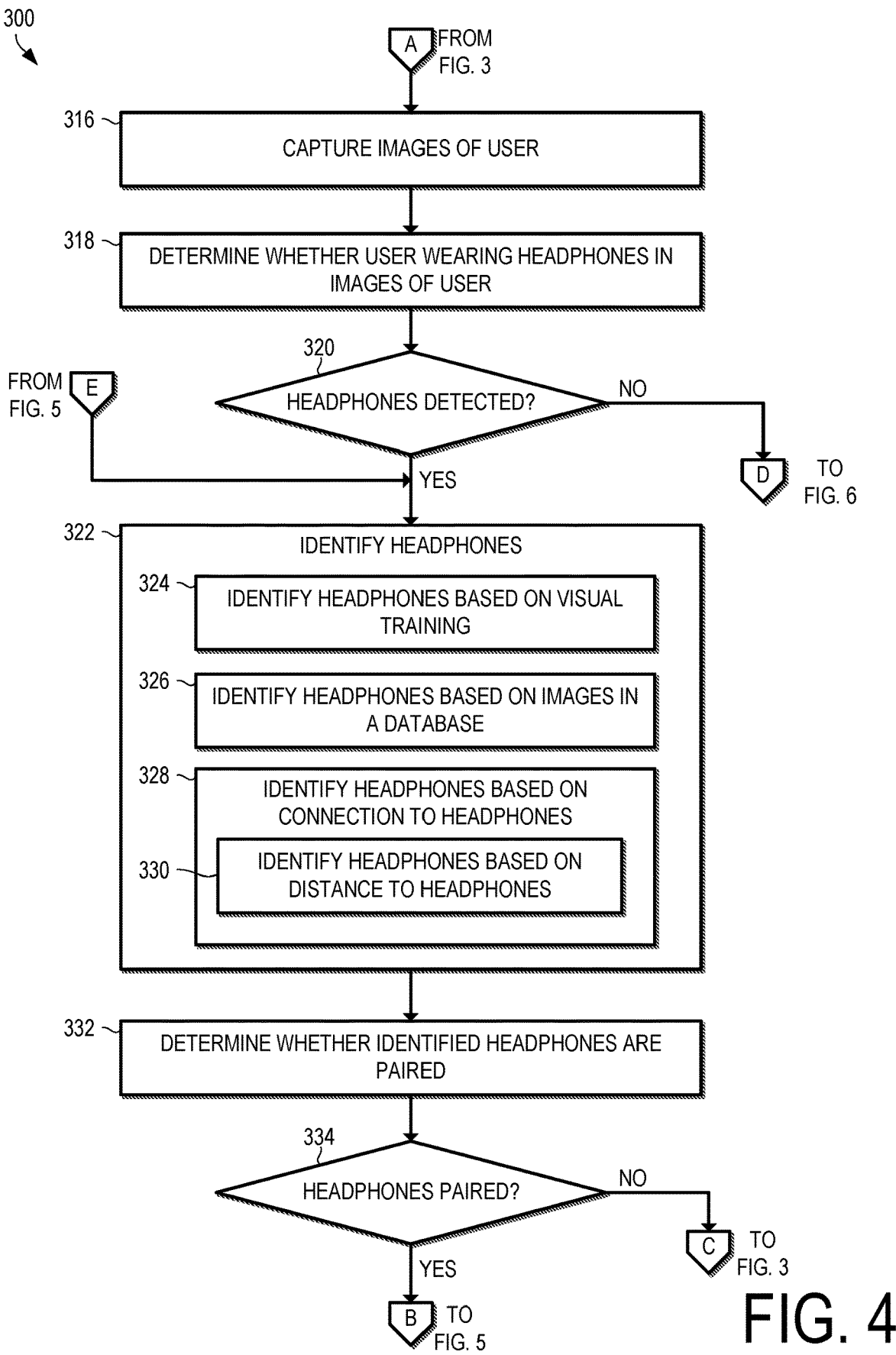

In block 304, if new headphones 112 are not detected, the method 300 jumps to block 316 in FIG. 4 to monitor images of the user for headphones 112. If new headphones 112 are detected, the method 300 proceeds to block 306, in which the compute device 100 is paired with the new headphones 112. The compute device 100 may prompt the user for input as part of the pairing process, such as a code associated with the new headphones 112.

In block 308, the compute device 100 requests visual training of the new headphones 112. The compute device 100 may, e.g., prompt the user to begin a training process. In block 310, if the user accepts the request for visual training, the method 300 proceeds to block 312. In block 312, the compute device 100 captures images of the user wearing the headphones 112. The compute device 100 may, e.g., prompt the user to turn his or her head at different angles. The compute device 100 may use machine-learning-based algorithms to recognize the headphones 112 worn by the user. In some embodiments, the compute device 100 may automatically perform visual training without an explicit request or instructions from the user. The method 300 then proceeds to block 316 in FIG. 4 to monitor images of the user for headphones 112.

Referring back to block 310, if the user rejects the visual training, the method 300 proceeds to block 314, in which the compute device 100 may access images of the headphones 112 from a database. The compute device 100 may, e.g., access images corresponding to the model of the headphones 112. The accessed images may be used by the compute device 100 to identify the headphones 112. The compute device 100 may save the images or may save parameters of a machine-learning-based algorithm that can recognize the headphones 112 in the images.

Referring now to FIG. 4, in block 316, the compute device 100 captures one or more images of the user of the compute device 100 using the camera 120. In block 318, the compute device 100 determines whether the user is wearing headphones 112 in the images of the user. To do so, the compute device 100 may use images or parameters stored during a visual training performed in block 312 or images accessed in block 314. In some embodiments, the compute device 100 may recognize headphones 112 for which the compute device 100 has not been visually trained.

Figure 6:
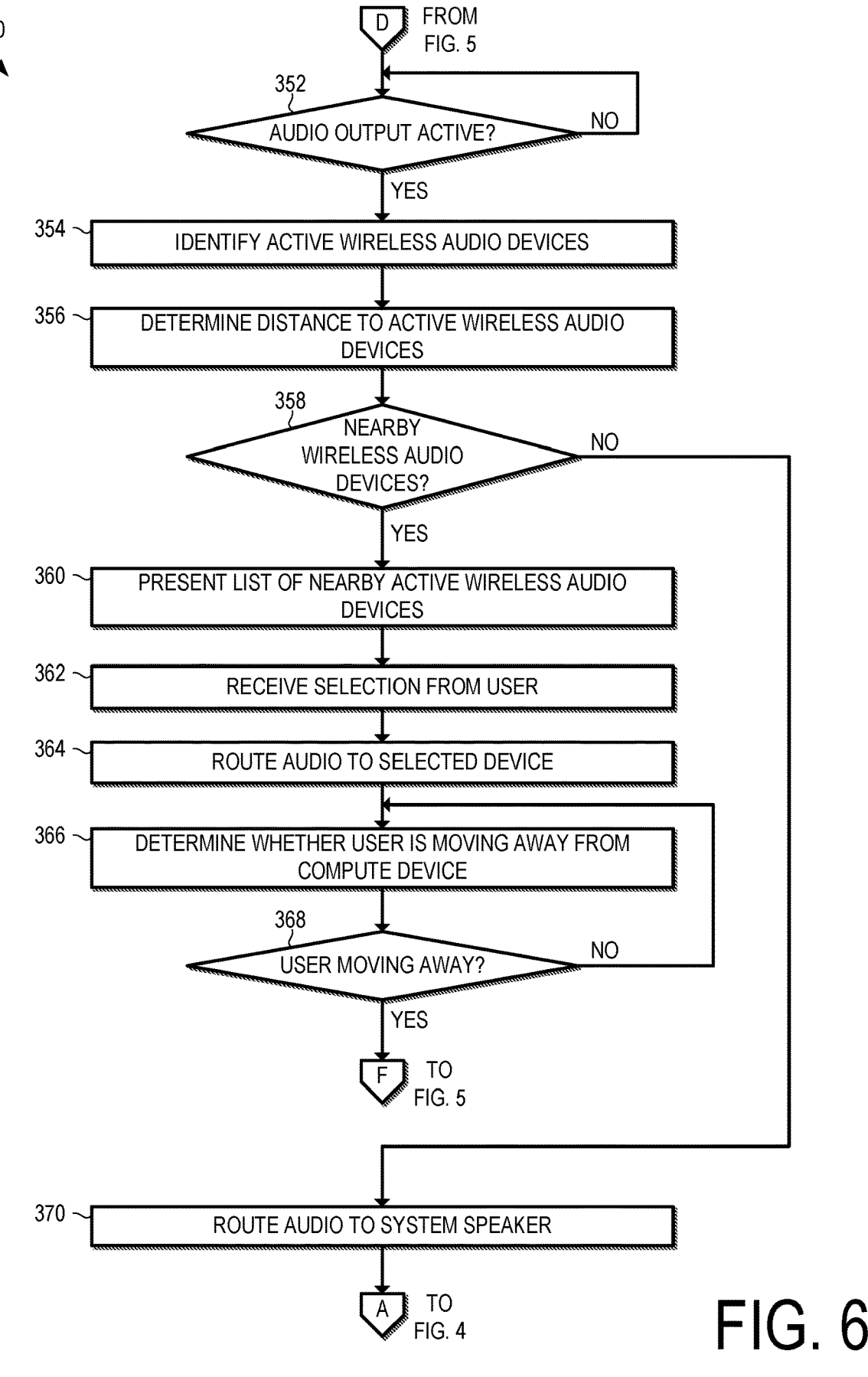

In block 320, if headphones 112 are not detected, the method 300 jumps to block 352 in FIG. 6, in which the compute device 100 checks whether the audio output is active. In some embodiments, the compute device 100 may continue to capture images of the user and check for headphones 112, even if audio is routed to a wireless speaker 114.

Referring back to block 320, if headphones 112 are detected, the method 300 proceeds to block 322, in which the compute device 100 identifies the headphones 112 that the user is wearing. In block 324, the compute device 100 identifies the headphones 112 based on the visual training performed in block 312. In some embodiments, two headphones 112 that are active may be indistinguishable. In such embodiments, the compute device 100 may use other information to determine which headphones 112 the user has on, such as high accuracy distance measurement (HADM). In block 326, the compute device 100 identifies the headphones 112 based on images or other information in a database. In block 328, the compute device 100 identifies the headphones 112 based on a connection to the headphones 112. For example, if only one set of headphones 112 is connected to the compute device 100, the compute device 100 may infer that the headphones 112 the user is wearing are the same headphones 112 connected to the compute device 100. In another example, the compute device 100 may observe that headphones 112 were connected about the same time the user put on the headphones 112 and infer that the headphones 112 that were just connected are the same headphones 112 the user put on. In some embodiments, in block 330, the compute device 100 identifies headphones 112 based on a distance to the headphones 112 from the compute device 100. The compute device 100 may use, e.g., high accuracy distance measurement (HADM) using wireless signals to determine a distance of the headphones 112. The compute device 100 may identify the headphones 112 in the images of the user if they are, e.g., about the right distance away or closer than other headphones 112.

Figure 5:
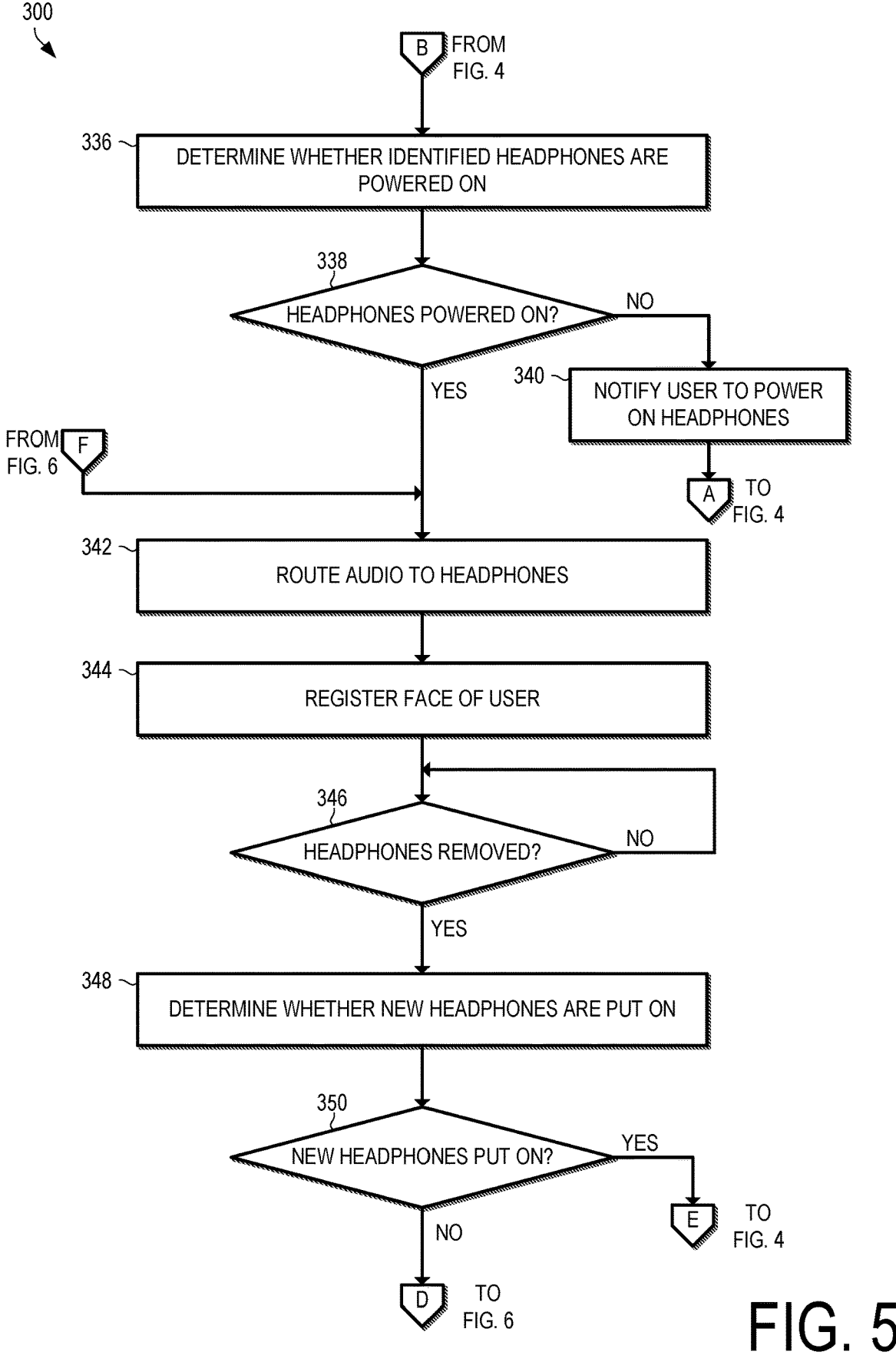

In block 332, the compute device 100 determines whether it is paired with the identified headphones 112. In block 334, if the compute device 100 is not paired with the headphones 112, the compute device 100 jumps back to block 306 in FIG. 3 to pair with the headphones 112. If the compute device is paired with the headphones 112, the compute device 100 proceeds to block 336 in FIG. 5, in which the compute device 100 determines whether the headphones 112 are powered on.

In block 338, if the headphones 112 are not powered on, the method 300 proceeds to block 340, in which the compute device 100 notifies the user to power on the headphones 112. The method 300 then loops back to block 316 in FIG. 4 to monitor images of the user for headphones 112. If the headphones 112 are powered on, the method 300 proceeds to block 342, in which the compute device 100 routes audio output to the headphones 112.

In block 344, the compute device 100 temporarily registers a face of the user wearing the headphones 112. As the compute device 100 has identified the user wearing the headphones 112, the compute device 100 can maintain audio routing to the headphones 112, even if the registered user leaves the view of the camera 120. Additionally, if another person comes into the field of view, the compute device 100 can maintain the audio routed to the headphones 112, ensuring privacy for the registered user.

In block 346, the compute device 100 checks whether the headphones 112 have been removed. If they have not been, the method 300 loops back to block 346 to again check whether the headphones 112 have been removed. If the headphones 112 have been removed, which the compute device 100 may determine by, e.g., analyzing images of the user taken by the camera 120, the method 300 proceeds to block 348, in which the compute device 100 determines whether the user has put on a new set of headphones 112.

In block 350, if the user has put on a new set of headphones 112, the method 300 loops back to block 322 in FIG. 4 to identify the new headphones. If the user has not put on a new set of headphones, the method 300 proceeds to block 352 in FIG. 6.

Referring now to FIG. 6, in block 352, the compute device 100 checks whether an audio output is active. If it is not, the method 300 loops back to block 352 to again check whether audio output is active. If audio output is active, the method 300 proceeds to block 354, in which the compute device 100 identifies active wireless audio devices, such as wireless headphones 112 and wireless speakers 114. The compute device 100 may identify, e.g., wireless audio devices 112, 114 that are powered on and paired to the compute device 100.

In block 356, the compute device 100 determines a distance to each of the active wireless audio devices 112, 114. The compute device 100 may use, e.g., high accuracy distance measurement (HADM) using wireless signals to determine a distance of the active wireless audio devices 112, 114.

In block 358, if there are nearby wireless audio devices 112, 114, the method 300 proceeds to block 360, in which the compute device 100 presents a list of nearby active wireless audio devices 112, 114 to the user. A device 112, 114 may be considered nearby if it is within a threshold distance of the compute device 100, such as 1-5 meters.

In block 362, the compute device 100 may receive a selection of a wireless audio device 112, 114 from a user. In block 364, the compute device 100 routes audio output to the selected device 112, 114.

In block 366, the compute device 100 determines whether the user is moving away from the compute device 100, such as by checking whether the user is within a frame of images captured by the camera 120.

In block 368, if the user is not moving away, the method 300 loops back to block 366 to determine if the user is moving away. If the user is moving away, the method 300 jumps back to block 342 in FIG. 5, in which the compute device 100 routes audio output to headphones 112 of the user, allowing the user to continue hearing the audio as the user walks away from the compute device 100.

Referring back to block 358, if there are not any wireless audio devices 112, 114 nearby, the method 300 proceeds to block 370, in which the compute device 100 routes audio output to the system speakers 118. The method 300 then loops back to block 316 in FIG. 4 to monitor images of the user for headphones 112.

EXAMPLES

Illustrative examples of the technologies disclosed herein are provided below. An embodiment of the technologies may include any one or more, and any combination of, the examples described below.

Example 1 includes a compute device comprising headphone detector circuitry to capture one or more images of a user of the compute device; determine that the user is wearing headphones based on the one or more images of the user; and select the headphones for audio output based on the determination that the user is wearing the headphones.

Example 2 includes the subject matter of Example 1, and wherein the headphone detector circuitry is further to determine a distance from the compute device to the headphones, wherein to determine that the user is wearing the headphones based on the one or more images of the user comprises to determine that the user is wearing the headphones at least partially based on the distance from the compute device to the headphones.

Example 3 includes the subject matter of any of Examples 1 and 2, and wherein the headphone detector circuitry is further to match the headphones that the user is wearing with one of a plurality of headphones stored in a database on the compute device.

Example 4 includes the subject matter of any of Examples 1-3, and wherein the headphone detector circuitry is further to capture one or more additional images of the user of the compute device; determine that the user has removed the headphones based on the one or more additional images of the user; and select a device different from the headphones for audio output based on the determination that the user has removed the headphones.

Example 5 includes the subject matter of any of Examples 1-4, and further including audio device selector circuitry to identify a plurality of active wireless audio devices; determine a distance between the compute device and each active wireless audio device of the plurality of active wireless audio devices; and select, in response to the determination that the user has removed the headphones, one of the plurality of active wireless audio devices for audio output based on the determined distances.

Example 6 includes the subject matter of any of Examples 1-5, and further including audio device selector circuitry to search for active wireless audio devices less than a threshold distance from the compute device; select a system speaker of the compute device for audio output based on the determination that the user has removed the headphones and a determination that there are no active wireless audio devices less than the threshold distance from the compute device.

Example 7 includes the subject matter of any of Examples 1-6, and further including headphone link manager circuitry to capture one or more training images of the user wearing the headphones during a visual training for the headphones, wherein to determine that the user is wearing the headphones comprises to determine that the user is wearing the headphones at least partially based on the one or more training images.

Example 8 includes the subject matter of any of Examples 1-7, and further including headphone link manager circuitry to capture one or more additional images of the user wearing the headphones before the headphones are paired with the compute device; identify the headphones in the one or more additional images; and pair, in response to identification of the headphones in the one or more additional images, the headphones with the compute device. wherein to determine that the user is wearing the headphones comprises to determine that the user is wearing the headphones at least partially based on the one or more training images.

Example 9 includes a compute device comprising audio device selector circuitry to identify a plurality of active wireless audio devices; determine a distance between the compute device and each active wireless audio device of the plurality of active wireless audio devices; and select one of the plurality of active wireless audio devices for audio output based on the determined distances.

Example 10 includes the subject matter of Example 9, and wherein to select the one of the plurality of active wireless audio devices for audio output based on the determined distance present a list of one or more active wireless audio devices less than a threshold distance from the compute device; and receive a selection of the one of the plurality of active wireless audio devices for audio output from a user of the compute device.

Example 11 includes the subject matter of any of Examples 9 and 10, and further including headphone link manager circuitry to capture one or more images of a user of the compute device; and determine that the user is not wearing headphones based on the one or more images of the user, wherein to select the one of the plurality of active wireless audio devices for audio output based on the determined distances comprises to select the one of the plurality of active wireless audio devices for audio output based on the determined distances in response to a determination that the user is not wearing headphones.

Example 12 includes the subject matter of any of Examples 9-11, and wherein the audio device selector circuitry is further to capture one or more images of the user walking away from the compute device while wearing headphones; identify the user walking away in the one or more images; provide, in response to identification of the user walking away in the one or more images, audio output to the headphones.

Example 13 includes the subject matter of any of Examples 9-12, and further including headphone detector circuitry to capture one or more images of a user of the compute device; determine that the user is wearing headphones based on the one or more images of the user; and select the headphones for audio output based on the determination that the user is wearing the headphones.

Example 14 includes the subject matter of any of Examples 9-13, and wherein the headphone detector circuitry is further to determine a distance from the compute device to the headphones, wherein to determine that the user is wearing the headphones based on the one or more images of the user comprises to determine that the user is wearing the headphones at least partially based on the distance from the compute device to the headphones.

Example 15 includes a method comprising capturing, by a compute device, one or more images of a user of the compute device; determining, by the compute device, that the user is wearing headphones based on the one or more images of the user; and selecting, by the compute device, the headphones for audio output based on the determination that the user is wearing the headphones.

Example 16 includes the subject matter of Example 15, and further including determining, by the compute device, a distance from the compute device to the headphones, wherein determining that the user is wearing the headphones based on the one or more images of the user comprises determining that the user is wearing the headphones at least partially based on the distance from the compute device to the headphones.

Example 17 includes the subject matter of any of Examples 15 and 16, and further including matching, by the compute device, the headphones that the user is wearing with one of a plurality of headphones stored in a database on the compute device.

Example 18 includes the subject matter of any of Examples 15-17, and further including capturing, by the compute device, one or more additional images of the user of the compute device; determining, by the compute device, that the user has removed the headphones based on the one or more additional images of the user; and selecting, by the compute device, a device different from the headphones for audio output based on the determination that the user has removed the headphones.

Example 19 includes the subject matter of any of Examples 15-18, and further including identifying, by the compute device, a plurality of active wireless audio devices; determining, by the compute device, a distance between the compute device and each active wireless audio devices of the plurality of active wireless audio devices; and selecting, by the compute device and in response to the determination that the user has removed the headphones, one of the plurality of active wireless audio devices for audio output based on the determined distances.

Example 20 includes the subject matter of any of Examples 15-19, and further including searching, by the compute device, for active wireless audio devices less than a threshold distance from the compute device; selecting, by the compute device, a system speaker of the compute device for audio output based on the determination that the user has removed the headphones and a determination that there are no active wireless audio devices less than the threshold distance from the compute device.

Example 21 includes the subject matter of any of Examples 15-20, and further including capturing, by the compute device, one or more training images of the user wearing the headphones during a visual training for the headphones, wherein determining that the user is wearing the headphones comprises determining that the user is wearing the headphones at least partially based on the one or more training images.

Example 22 includes the subject matter of any of Examples 15-21, and further including capturing, by the compute device, one or more additional images of the user wearing the headphones before the headphones are paired with the compute device; identifying, by the compute device, the headphones in the one or more additional images; and pairing, by the compute device and in response to identification of the headphones in the one or more additional images, the headphones with the compute device. wherein determining that the user is wearing the headphones comprises determining that the user is wearing the headphones at least partially based on the one or more training images.

Example 23 includes a method comprising identifying, by a compute device, a plurality of active wireless audio devices; determining, by the compute device, a distance between the compute device and each active wireless audio device of the plurality of active wireless audio devices; and selecting, by the compute device, one of the plurality of active wireless audio devices for audio output based on the determined distances.

Example 24 includes the subject matter of Example 23, and wherein selecting the one of the plurality of active wireless audio devices for audio output based on the determined distances comprises presenting, by the compute device, a list of one or more active wireless audio devices less than a threshold distance from the compute device; and receiving, by the compute device, a selection of the one of the plurality of active wireless audio devices for audio output from a user of the compute device.

Example 25 includes the subject matter of any of Examples 23 and 24, and further including capturing, by the compute device, one or more images of a user of the compute device; and determining, by the compute device, that the user is not wearing headphones based on the one or more images of the user, wherein selecting the one of the plurality of active wireless audio devices for audio output based on the determined distances comprises selecting the one of the plurality of active wireless audio devices for audio output based on the determined distances in response to a determination that the user is not wearing headphones.

Example 26 includes the subject matter of any of Examples 23-25, and further including capturing, by the compute device, one or more images of the user walking away from the compute device while wearing headphones; identifying, by the compute device, the user walking away in the one or more images; providing, by the compute device and in response to identification of the user walking away in the one or more images, audio output to the headphones.

Example 27 includes the subject matter of any of Examples 23-26, and further including capturing, by the compute device, one or more images of a user of the compute device; determining, by the compute device, that the user is wearing headphones based on the one or more images of the user; and selecting, by the compute device, the headphones for audio output based on the determination that the user is wearing the headphones.

Example 28 includes the subject matter of any of Examples 23-27, and further including determining, by the compute device, a distance from the compute device to the headphones, wherein determining that the user is wearing the headphones based on the one or more images of the user comprises determining that the user is wearing the headphones at least partially based on the distance from the compute device to the headphones.

Example 29 includes a compute device comprising means for capturing one or more images of a user of the compute device; means for determining that the user is wearing headphones based on the one or more images of the user; and means for selecting the headphones for audio output based on the determination that the user is wearing the headphones.

Example 30 includes the subject matter of Example 29, and further including means for determining a distance from the compute device to the headphones, wherein the means for determining that the user is wearing the headphones based on the one or more images of the user comprises means for determining that the user is wearing the headphones at least partially based on the distance from the compute device to the headphones.

Example 31 includes the subject matter of any of Examples 29 and 30, and further including means for matching the headphones that the user is wearing with one of a plurality of headphones stored in a database on the compute device.

Example 32 includes the subject matter of any of Examples 29-31, and further including means for capturing one or more additional images of the user of the compute device; means for determining that the user has removed the headphones based on the one or more additional images of the user; and means for selecting a device different from the headphones for audio output based on the determination that the user has removed the headphones.

Example 33 includes the subject matter of any of Examples 29-32, and further including means for identifying a plurality of active wireless audio devices; means for determining a distance between the compute device and each active wireless audio device of the plurality of active wireless audio devices; and means for selecting, in response to the determination that the user has removed the headphones, one of the plurality of active wireless audio devices for audio output based on the determined distances.

Example 34 includes the subject matter of any of Examples 29-33, and further including means for searching for active wireless audio devices less than a threshold distance from the compute device; means for selecting a system speaker of the compute device for audio output based on the determination that the user has removed the headphones and a determination that there are no active wireless audio devices less than the threshold distance from the compute device.

Example 35 includes the subject matter of any of Examples 29-34, and further including means for capturing one or more training images of the user wearing the headphones during a visual training for the headphones, wherein the means for determining that the user is wearing the headphones comprises means for determining that the user is wearing the headphones at least partially based on the one or more training images.

Example 36 includes the subject matter of any of Examples 29-35, and further including means for capturing one or more additional images of the user wearing the headphones before the headphones are paired with the compute device; means for identifying the headphones in the one or more additional images; and means for pairing, in response to identification of the headphones in the one or more additional images, the headphones with the compute device. wherein the means for determining that the user is wearing the headphones comprises means for determining that the user is wearing the headphones at least partially based on the one or more training images.

Example 37 includes a compute device comprising means for identifying a plurality of active wireless audio devices; means for determining a distance between the compute device and each active wireless audio device of the plurality of active wireless audio devices; and means for selecting one of the plurality of active wireless audio devices for audio output based on the determined distances.

Example 38 includes the subject matter of Example 37, and wherein the means for selecting the one of the plurality of active wireless audio devices for audio output based on the determined distances comprises means for presenting a list of one or more active wireless audio devices less than a threshold distance from the compute device; and means for receiving a selection of the one of the plurality of active wireless audio devices for audio output from a user of the compute device.

Example 39 includes the subject matter of any of Examples 37 and 38, and further including means for capturing one or more images of a user of the compute device; and means for determining that the user is not wearing headphones based on the one or more images of the user, wherein the means for selecting the one of the plurality of active wireless audio devices for audio output based on the determined distances comprises means for selecting the one of the plurality of active wireless audio devices for audio output based on the determined distances in response to a determination that the user is not wearing headphones.

Example 40 includes the subject matter of any of Examples 37-39, and further including means for capturing one or more images of the user walking away from the compute device while wearing headphones; means for identifying the user walking away in the one or more images; means for providing, in response to identification of the user walking away in the one or more images, audio output to the headphones.

Example 41 includes the subject matter of any of Examples 37-40, and further including means for capturing one or more images of a user of the compute device; means for determining that the user is wearing headphones based on the one or more images of the user; and means for selecting the headphones for audio output based on the determination that the user is wearing the headphones.

Example 42 includes the subject matter of any of Examples 37-41, and further including means for determining a distance from the compute device to the headphones, wherein the means for determining that the user is wearing the headphones based on the one or more images of the user comprises means for determining that the user is wearing the headphones at least partially based on the distance from the compute device to the headphones.

Example 43 includes one or more computer-readable media comprising a plurality of instructions stored thereon that, when executed, causes a compute device to capture one or more images of a user of the compute device; determine that the user is wearing headphones based on the one or more images of the user; and select the headphones for audio output based on the determination that the user is wearing the headphones.

Example 44 includes the subject matter of Example 43, and wherein the plurality of instructions further causes the compute device to determine a distance from the compute device to the headphones, wherein to determine that the user is wearing the headphones based on the one or more images of the user comprises to determine that the user is wearing the headphones at least partially based on the distance from the compute device to the headphones.

Example 45 includes the subject matter of any of Examples 43 and 44, and wherein the plurality of instructions further causes the compute device to match the headphones that the user is wearing with one of a plurality of headphones stored in a database on the compute device.

Example 46 includes the subject matter of any of Examples 43-45, and wherein the plurality of instructions further causes the compute device to capture one or more additional images of the user of the compute device; determine that the user has removed the headphones based on the one or more additional images of the user; and select a device different from the headphones for audio output based on the determination that the user has removed the headphones.

Example 47 includes the subject matter of any of Examples 43-46, and wherein the plurality of instructions further causes the compute device to identify a plurality of active wireless audio devices; determine a distance between the compute device and each active wireless audio device of the plurality of active wireless audio devices; and select, in response to the determination that the user has removed the headphones, one of the plurality of active wireless audio devices for audio output based on the determined distances.

Example 48 includes the subject matter of any of Examples 43-47, and wherein the plurality of instructions further causes the compute device to search for active wireless audio devices less than a threshold distance from the compute device; select a system speaker of the compute device for audio output based on the determination that the user has removed the headphones and a determination that there are no active wireless audio devices less than the threshold distance from the compute device.

Example 49 includes the subject matter of any of Examples 43-48, and wherein the plurality of instructions further causes the compute device to capture one or more training images of the user wearing the headphones during a visual training for the headphones, wherein to determine that the user is wearing the headphones comprises to determine that the user is wearing the headphones at least partially based on the one or more training images.

Example 50 includes the subject matter of any of Examples 43-49, and wherein the plurality of instructions further causes the compute device to capture one or more additional images of the user wearing the headphones before the headphones are paired with the compute device; identify the headphones in the one or more additional images; and pair, in response to identification of the headphones in the one or more additional images, the headphones with the compute device. wherein to determine that the user is wearing the headphones comprises to determine that the user is wearing the headphones at least partially based on the one or more training images.

Example 51 includes one or more computer-readable media comprising a plurality of instructions stored thereon that, when executed, causes a compute device to identify a plurality of active wireless audio devices; determine a distance between the compute device and each active wireless audio device of the plurality of active wireless audio devices; and select one of the plurality of active wireless audio devices for audio output based on the determined distances.

Example 52 includes the subject matter of Example 51, and wherein to select the one of the plurality of active wireless audio devices for audio output based on the determined distances comprises to present a list of one or more active wireless audio devices less than a threshold distance from the compute device; and receive a selection of the one of the plurality of active wireless audio devices for audio output from a user of the compute device.

Example 53 includes the subject matter of any of Examples 51 and 52, and wherein the plurality of instructions further causes the compute device to capture one or more images of a user of the compute device; and determine that the user is not wearing headphones based on the one or more images of the user, wherein to select the one of the plurality of active wireless audio devices for audio output based on the determined distances comprises to select the one of the plurality of active wireless audio devices for audio output based on the determined distances in response to a determination that the user is not wearing headphones.

Example 54 includes the subject matter of any of Examples 51-53, and wherein the plurality of instructions further causes the compute device to capture one or more images of the user walking away from the compute device while wearing headphones; identify the user walking away in the one or more images; provide, in response to identification of the user walking away in the one or more images, audio output to the headphones.

Example 55 includes the subject matter of any of Examples 51-54, and wherein the plurality of instructions further causes the compute device to capture one or more images of a user of the compute device; determine that the user is wearing headphones based on the one or more images of the user; and select the headphones for audio output based on the determination that the user is wearing the headphones.

Example 56 includes the subject matter of any of Examples 51-55, and wherein the plurality of instructions further causes the compute device to determine a distance from the compute device to the headphones, wherein to determine that the user is wearing the headphones based on the one or more images of the user comprises to determine that the user is wearing the headphones at least partially based on the distance from the compute device to the headphones.

The invention claimed is:

1. A compute device comprising:

headphone detector circuitry to:

capture one or more images of a user of the compute device;

determine that the user is wearing headphones based on the one or more images of the user; and select the headphones for audio output based on the determination that the user is wearing the headphones.

2. The compute device of claim 1, wherein the headphone detector circuitry is further to determine a distance from the compute device to the headphones, wherein to determine that the user is wearing the headphones based on the one or more images of the user comprises to determine that the user is wearing the headphones at least partially based on the distance from the compute device to the headphones.

3. The compute device of claim 1, wherein the headphone detector circuitry is further to match the headphones that the user is wearing with one of a plurality of headphones stored in a database on the compute device.

4. The compute device of claim 1, wherein the headphone detector circuitry is further to:

capture one or more additional images of the user of the compute device;

determine that the user has removed the headphones based on the one or more additional images of the user; and select a device different from the headphones for audio output based on the determination that the user has removed the headphones.

5. The compute device of claim 4, further comprising audio device selector circuitry to:

identify a plurality of active wireless audio devices;

determine a distance between the compute device and each active wireless audio device of the plurality of active wireless audio devices; and select, in response to the determination that the user has removed the headphones, one of the plurality of active wireless audio devices for audio output based on the determined distances.

6. The compute device of claim 4, further comprising audio device selector circuitry to:

search for active wireless audio devices less than a threshold distance from the compute device;

select a system speaker of the compute device for audio output based on the determination that the user has removed the headphones and a determination that there are no active wireless audio devices less than the threshold distance from the compute device.

7. The compute device of claim 1, further comprising headphone link manager circuitry to capture one or more training images of the user wearing the headphones during a visual training for the headphones, wherein to determine that the user is wearing the headphones comprises to determine that the user is wearing the headphones at least partially based on the one or more training images.

8. The compute device of claim 1, further comprising headphone link manager circuitry to:

capture one or more additional images of the user wearing the headphones before the headphones are paired with the compute device;

identify the headphones in the one or more additional images; and pair, in response to identification of the headphones in the one or more additional images, the headphones with the compute device;

wherein to determine that the user is wearing the headphones comprises to determine that the user is wearing the headphones at least partially based on the one or more additional images.

9. A compute device comprising:

audio device selector circuitry to:

identify a plurality of active wireless audio devices;

determine a distance between the compute device and each active wireless audio device of the plurality of active wireless audio devices; and select one of the plurality of active wireless audio devices for audio output based on the determined distances; and headphone detector circuitry to:

capture one or more images of a user of the compute device;

determine that the user is wearing headphones based on the one or more images of the user; and select the headphones for audio output based on the determination that the user is wearing the headphones.

10. The compute device of claim 9, wherein to select the one of the plurality of active wireless audio devices for audio output based on the determined distances comprises to:

present a list of one or more active wireless audio devices less than a threshold distance from the compute device; and receive a selection of the one of the plurality of active wireless audio devices for audio output from a user of the compute device.

11. The compute device of claim 9, further comprising headphone link manager circuitry to:

capture one or more images of a user of the compute device; and determine that the user is not wearing headphones based on the one or more images of the user, wherein to select the one of the plurality of active wireless audio devices for audio output based on the determined distances comprises to select the one of the plurality of active wireless audio devices for audio output based on the determined distances in response to a determination that the user is not wearing headphones.

12. The compute device of claim 9, wherein the audio device selector circuitry is further to:

capture one or more images of the user walking away from the compute device while wearing headphones;

identify the user walking away in the one or more images;

provide, in response to identification of the user walking away in the one or more images, audio output to the headphones.

13. The compute device of claim 9, wherein the headphone detector circuitry is further to determine a distance from the compute device to the headphones, wherein to determine that the user is wearing the headphones based on the one or more images of the user comprises to determine that the user is wearing the headphones at least partially based on the distance from the compute device to the headphones.

14. One or more non-transitory computer-readable media comprising a plurality of instructions stored thereon that, when executed, causes a compute device to:

capture one or more images of a user of the compute device;

determine that the user is wearing headphones based on the one or more images of the user; and select the headphones for audio output based on the determination that the user is wearing the headphones.

15. The one or more non-transitory computer-readable media of claim 14, wherein the plurality of instructions further causes the compute device to determine a distance from the compute device to the headphones, wherein to determine that the user is wearing the headphones based on the one or more images of the user comprises to determine that the user is wearing the headphones at least partially based on the distance from the compute device to the headphones.

16. The one or more non-transitory computer-readable media of claim 14, wherein the plurality of instructions further causes the compute device to:

capture one or more additional images of the user of the compute device;

determine that the user has removed the headphones based on the one or more additional images of the user; and select a device different from the headphones for audio output based on the determination that the user has removed the headphones.

17. The one or more non-transitory computer-readable media of claim 16, wherein the plurality of instructions further causes the compute device to:

identify a plurality of active wireless audio devices;

determine a distance between the compute device and each active wireless audio device of the plurality of active wireless audio devices; and select, in response to the determination that the user has removed the headphones, one of the plurality of active wireless audio devices for audio output based on the determined distances.

18. The one or more non-transitory computer-readable media of claim 16, wherein the plurality of instructions further causes the compute device to:

search for active wireless audio devices less than a threshold distance from the compute device;

select a system speaker of the compute device for audio output based on the determination that the user has removed the headphones and a determination that there are no active wireless audio devices less than the threshold distance from the compute device.

19. The one or more non-transitory computer-readable media of claim 14, wherein the plurality of instructions further causes the compute device to capture one or more training images of the user wearing the headphones during a visual training for the headphones, wherein to determine that the user is wearing the headphones comprises to determine that the user is wearing the headphones at least partially based on the one or more training images.

20. The one or more non-transitory computer-readable media of claim 14, wherein the plurality of instructions further causes the compute device to:

capture one or more additional images of the user wearing the headphones before the headphones are paired with the compute device;

identify the headphones in the one or more additional images; and pair, in response to identification of the headphones in the one or more additional images, the headphones with the compute device;

wherein to determine that the user is wearing the headphones comprises to determine that the user is wearing the headphones at least partially based on the one or more additional images.

21. One or more non-transitory computer-readable media comprising a plurality of instructions stored thereon that, when executed, causes a compute device to:

identify a plurality of active wireless audio devices;

determine a distance between the compute device and each active wireless audio device of the plurality of active wireless audio devices; and select one of the plurality of active wireless audio devices for audio output based on the determined distances;

wherein the plurality of instructions further causes the compute device to:

capture one or more images of a user of the compute device; and determine that the user is not wearing headphones based on the one or more images of the user, wherein to select the one of the plurality of active wireless audio devices for audio output based on the determined distances comprises to select the one of the plurality of active wireless audio devices for audio output based on the determined distances in response to a determination that the user is not wearing headphones.

22. The one or more non-transitory computer-readable media of claim 21, wherein to select the one of the plurality of active wireless audio devices for audio output based on the determined distances comprises to:

present a list of one or more active wireless audio devices less than a threshold distance from the compute device; and receive a selection of the one of the plurality of active wireless audio devices for audio output from a user of the compute device.

23. The one or more non-transitory computer-readable media of claim 21, wherein the plurality of instructions further causes the compute device to:

capture one or more images of the user walking away from the compute device while wearing headphones;

identify the user walking away in the one or more images;

provide, in response to identification of the user walking away in the one or more images, audio output to the headphones.

* * * * *